United States Patent
Seitz et al.

(10) Patent No.: US 8,502,647 B2
(45) Date of Patent: Aug. 6, 2013

(54) SYSTEM FOR CONTROLLING USER ACCESS TO A MACHINE TOOL

(75) Inventors: Reinhold Seitz, Hopferau (DE); Rudolf Hahn, Schwangau (DE); Armin Bornemann, Marktoberdorf (DE)

(73) Assignee: Deckel Maho Pfronten GmbH, Pfronten (DE)

( * ) Notice: Subject to any disclaimer, the term of this patent is extended or adjusted under 35 U.S.C. 154(b) by 974 days.

(21) Appl. No.: 12/230,597

(22) Filed: Sep. 2, 2008

(65) Prior Publication Data

US 2009/0079537 A1    Mar. 26, 2009

(30) Foreign Application Priority Data

Sep. 4, 2007 (DE) .......................... 10 2007 041 768
Mar. 28, 2008 (EP) ..................................... 08005964

(51) Int. Cl.
*G05B 19/00* (2006.01)
*G05B 19/18* (2006.01)
*G05B 11/01* (2006.01)

(52) U.S. Cl.
USPC ........... 340/10.5; 340/5.1; 340/5.2; 340/5.21; 340/5.24; 340/5.25; 700/253; 700/8; 700/18; 700/19

(58) Field of Classification Search
USPC ....................... 340/5.1, 5.2, 5.21–28, 5.31–33
See application file for complete search history.

(56) References Cited

U.S. PATENT DOCUMENTS

| | | | | |
|---|---|---|---|---|
| 5,555,376 A * | 9/1996 | Theimer et al. | ............... | 709/229 |
| 5,956,465 A * | 9/1999 | Takagi et al. | ................ | 700/255 |
| 6,107,768 A * | 8/2000 | Ouchi et al. | ...................... | 700/2 |
| 6,167,464 A * | 12/2000 | Kretschmann | .................. | 710/15 |
| 6,249,727 B1 * | 6/2001 | Muller | .............................. | 701/36 |
| 6,381,502 B1 * | 4/2002 | Rudder et al. | ...................... | 700/2 |
| 6,463,352 B1 * | 10/2002 | Tadokoro et al. | ............. | 700/169 |
| 6,917,846 B1 * | 7/2005 | Muller | ........................... | 700/108 |
| 6,989,749 B2 * | 1/2006 | Mohr | .......................... | 340/572.1 |
| 7,039,951 B1 * | 5/2006 | Chaudhari et al. | ................. | 726/7 |
| 7,143,149 B2 * | 11/2006 | Oberg et al. | .................... | 709/220 |
| 7,269,463 B2 * | 9/2007 | Nagatsuka et al. | ............. | 700/17 |
| 7,272,456 B2 * | 9/2007 | Farchmin et al. | ............... | 700/66 |
| 7,298,275 B2 * | 11/2007 | Brandt et al. | ............... | 340/573.1 |
| 7,353,142 B2 * | 4/2008 | Azpitarte | ....................... | 702/184 |
| 7,403,765 B2 * | 7/2008 | Miyashita | ...................... | 455/411 |
| 7,420,546 B2 * | 9/2008 | Abdallah et al. | ............... | 345/173 |
| 7,437,212 B2 * | 10/2008 | Farchmin et al. | ............. | 700/221 |
| 7,530,113 B2 * | 5/2009 | Braun | ............................. | 726/28 |
| 7,616,095 B2 * | 11/2009 | Jones et al. | ................... | 340/10.5 |
| 7,664,961 B2 * | 2/2010 | Blattner et al. | ............... | 713/186 |
| 7,694,331 B2 * | 4/2010 | Vesikivi et al. | ................... | 726/9 |

(Continued)

FOREIGN PATENT DOCUMENTS

| | | |
|---|---|---|
| AT | 501 688 A1 | 10/2006 |
| DE | 100 37 003 B4 | 11/2005 |

*Primary Examiner* — Daniel Wu
*Assistant Examiner* — Muhammad Adnan
(74) *Attorney, Agent, or Firm* — Oliff & Berridge, PLC (57) ABSTRACT

The invention relates to a machine tool 101 comprising a plurality of operation functions and a selection device 113a-113d for selecting one or more operation functions by a user. The machine tool 101 receives data from a mobile data carrier 311 via a reception device 112, on the basis of which it may be determined which operation functions may be performed by the user. In this process, an access control device 130 grants the user access to only those selected operation functions he or she is authorized to perform.

9 Claims, 4 Drawing Sheets

U.S. PATENT DOCUMENTS

| | | | |
|---|---|---|---|
| 7,813,822 B1* | 10/2010 | Hoffberg | 700/94 |
| 8,116,454 B2* | 2/2012 | Balabine et al. | 380/258 |
| 8,204,225 B2* | 6/2012 | Balabine et al. | 380/270 |
| 8,266,681 B2* | 9/2012 | Deshpande et al. | 726/5 |
| 2002/0061295 A1* | 5/2002 | Field | 424/93.21 |
| 2004/0260518 A1* | 12/2004 | Polz et al. | 702/188 |
| 2005/0193182 A1* | 9/2005 | Anderson et al. | 711/163 |
| 2005/0212656 A1* | 9/2005 | Denison et al. | 340/5.73 |
| 2006/0069921 A1* | 3/2006 | Camaisa et al. | 713/182 |
| 2006/0076404 A1* | 4/2006 | Frerking | 235/382 |
| 2007/0038351 A1* | 2/2007 | Larschan et al. | 701/35 |
| 2009/0182460 A1* | 7/2009 | O'Neal et al. | 701/2 |

* cited by examiner

SYSTEM FOR CONTROLLING USER ACCESS TO A MACHINE TOOL

The present invention relates to a machine tool comprising an access control device set up to control the access to the machine tool.

Access controls to machine tools by means of one or more key switches are known from the prior art. Individual operation modes of the machine in the sense of the European guidelines and standards are selectively activated via these key switches.

Starting from the prior art, it is an object of the present invention to provide a machine tool which allows an improved control of the access to the machine tool.

According to the invention, this object is achieved by the subject matters of the independent claims. Advantageous layouts and preferred embodiments of the invention are stated in the dependent claims.

The invention comprises a machine tool comprising a plurality of operation functions and a selection device for selecting one or more operation functions by a user. Furthermore, the inventive machine tool comprises a reception device for receiving data from a mobile data carrier, a determining device for determining on the basis of the data received which operation functions may be performed by the user, and an access control device set up to control access to the machine tool with respect to the selected at least one operation function and to grant the user access to only those selected operation functions which the user is authorized to perform.

According to the invention, the machine tool has the advantage that the data with respect to access control are provided by a mobile data carrier. Thus, depending on the technology used of the mobile data carrier, the data may be definitely voluminous so that a plurality of authorization levels and, by means of the data, an exact specification as to which user may perform which operation functions on which machine tool become possible. Additionally, the mobile data carrier contributes to achieving an improvement of the manageability of the access solution.

Preferably, the reception device comprises a reading device set up to interact with a transponder on a mobile data carrier. Preferably, the reading device as well as the transponder are based on RFID technology (radio frequency identification). However, the reception device may also be based on other technologies. For example, the reception device may comprise a bar code reader interacting with a bar code. It is also possible for the reception device to comprise a chip card reading device and a magnetic strip card reading device, respectively, which is set up to read chip cards and magnetic strip cards, respectively. Such chip cards may e.g. be made in the form of memory cards or also microprocessor cards. A realisation on the basis of a USB port interacting with a USB memory stick is also possible.

In an advantageous embodiment the data received by the reception device comprise authorization data indicating which operation functions the user may perform on the machine tool. This has the advantage that authorizations may be directly derived from the data.

However, it is also possible that the data received by the reception unit identify a user and that the determining device comprises means for inquiring authorization data of the identified user. For example, it is possible that a mobile data carrier is used which merely sends the user's identity.

Such mobile data carriers might for example be used in a manufacturing plant in order to acquire the working hours of the workers. In such a system the workers, when entering the factory building, direct their mobile data carriers past a reading device that resembles a clock card machine. The same mobile data carrier could send the user identification to the machine tool which then would determine the authorizations the user has on the corresponding machine tool on the basis of the user identification. For example, the user identification could be sent via a local data network from the machine tool to a server that determines which operation functions the user may perform on the respective machine tool on the basis of the user identification and a data stock giving information on the machine tool trainings attended by the user.

In a preferred embodiment the selected one or more operation functions correspond to an operation mode of the machine tool according to the European guidelines and standards (such as DIN EN 12417 "Machine Tools—Safety—Machining Centres" and DIN EN 13128 "Machine Tools—Safety—Milling and Boring Machines"). Possible operation modes are e.g. automatic mode, setup mode, extended setup mode, process monitoring and service mode. However, the invention is not limited to these operation modes. An operation function may, for example, also comprise the updating of software or the administration of software components installed on the machine tool.

Preferably, the machine tool comprises an allocation device for allocating one or more operation functions to a plurality of authorization levels. This has the advantage that operation functions of the machine tool may be combined in groups allocated to authorization levels. Depending on the allocation of operation functions to authorization levels, authorization levels may be allocated e.g. according to the risk when performing operation functions or according to the users' qualifications or other classifications of the operation functions. Furthermore, the allocation device for allocating operation functions to authorization levels enable a change of the allocation by operating the allocation device for allocating operation functions to authorization levels. Thus, the allocation is variable and can be adapted to the requirements.

Preferably, the data received from the reception device comprise a piece of information on the authorization level of a user, the user having a specific authorization level being authorized to perform one or more operation functions allocated to the authorization level. This has the advantage that it can be determined which operation functions the user may perform on the basis of his or her authorization level and the information as to which operation functions are allocated to this authorization level.

In a particular embodiment of the machine tool the authorization levels are in hierarchical order and a user having a specific authorization level is authorized to perform operation functions allocated to the user's authorization level or to an authorization level of a lower rank.

In a further embodiment only a user of the authorization level of the highest rank is authorized to operate the allocation device for allocating operation functions to authorization levels.

In a preferred embodiment the machine tool comprises a log-on device for logging on users, only logged-on users being authorized to perform operation functions of the machine. Here, log-in is to be understood as a registration of users at the respective machine. If data of a mobile data carrier of a not yet logged-on user are received by the reception device, it is determined that the user is not authorized to perform operation functions of the machine tool.

This has the advantage that the mobile data carrier may be used for several of the above-described machine tools. Even if the user has a specific authorization level or a mobile data carrier with a specific authorization level, it is thus ensured that the user is not automatically authorized to perform operation functions of the respective machine on any machine tool. First, he or she must be logged on. Even in this case it is possible that only a user of the highest ranking authorization level is authorized to operate the log-on device for logging on users.

Preferably, the log-on device for logging on users enables the input of changeable training data, the changeable training data indicating which machine tool trainings the user to be logged on has attended, and the user being authorized to perform one or more operation functions of the machine tool on the basis of the training data.

This has the advantage that an authorization to perform specific operation functions of the machine tool may be cleared for a user if he or she has attended training for the operation functions in question. The training data are changeable so that the log-on device for logging on users makes it possible to change the training data of a user already logged on if he or she has attended training. Thus, it is not necessary to newly log on a user if he or she has attended training.

Preferably, the training data are encrypted through a determined algorithm and the log-on device for logging on users comprises means for decrypting the training data.

This has the advantage that misuse by users or the input of faked training data is not possible because the algorithm only leads to meaningfully decrypted training data upon their decryption if the training data were correctly encrypted.

In a preferred embodiment the machine tool comprises data storage means for storing the log-on data indicating which users are logged on to the machine tool.

This is advantageous because thus it will be stored which users have already been logged on to the machine tool. Thus, a repeated log-on is not necessary.

In a particularly advantageous embodiment the machine tool furthermore comprises means for transmitting the log-on data stored in the data storage means to an external storage means and for transmitting the log-on data stored in an external storage means to the data storage means of the machine tool. Particular advantages result if the external storage means is a USB memory stick. In this case the means for transmitting the data stored in the data storage means would have to comprise a USB port. However, other embodiments of the external storage means are also possible, such as disks, magnetic strip cards, chip cards, portable or non-portable hard disks and a server connected to the machine tool.

This has the advantage that the log-on data of a machine tool may be transmitted to the external storage means and then may be transmitted from the external storage means to another machine tool. Thus, it is possible to log on a plurality of user to the other machine tool without the need for each single mobile data carrier of every user to be logged on. Furthermore, it is possible that the means for transmitting the log-on data stored in the data memory comprises a device for wirelessly sending and receiving data so that it is possible to omit external storage means and to directly transmit log-on data from one machine tool to another machine tool.

Preferably, the data storage means of the machine tool furthermore stores operation data indicating which operation functions the machine tool performs, by which user the operation functions of the machine tool are performed and when the user performs the operation functions.

This has the advantage that at a later point in time it is possible to trace back which user performed which operation functions on the machine tool at what point in time. Thus, an electronic control log is integrated in the machine tool with which it is possible to automatically acquire the timely sequence and the kind of control access to the operation functions by identified users.

Preferably, the inventive machine tool comprises display means for displaying that the user is not authorized to perform the selected at least one operation function if the user selects an operation function he or she is not authorized to perform. This display means may e.g. issue an acoustic signal or it may also be a window appearing in the display of the machine tool. In a preferred embodiment the display means is realized via a light emitting diode in the immediate vicinity of the selection device.

Preferably, the reception device is located in a housing protected against dirt accumulation. Earlier key solutions in particular had a problem of lacking impermeability to cooling lubricants and dusts and therefore required intensive maintenance and were prone to failures. According to the invention, the reception device can receive data preferably in a wireless manner so that the reception device may be integrated in a housing which shields the reception device from the influence of cooling lubricants and dusts. This reduces maintenance work and the proneness to failures of the access control solution.

For performing a predetermined operation function a key of the selection device must preferably be kept pressed by the user during the performance of the operation function. This makes it possible that by releasing the key the operation function is stopped immediately and ensures that the hand pressing the key cannot get caught by the moving parts of the machine tool.

Basically, it is possible to continue working on the machine tool in the selected operation function even after the mobile data carrier has been removed. For example, a program once started will continue to be processed even if the mobile data carrier has been removed.

In a preferred embodiment, however, the machine tool comprises means for locking the selection device if the reception device does not receive any data. This makes it possible that the user of the machine tool may simply remove his or her mobile data carrier from the machine tool and that in this manner the currently selected operation function cannot be started again without the reception device receiving data anew. This is particularly reasonable in the case of special functions, such as 5 axes machining and programming in connection therewith, where it is to be ensured that specific functions may only be performed by correspondingly trained staff having the appropriate authorization.

Preferably, the machine tool comprises a control desk to which a mobile data carrier can be attached. The attachment may e.g. be realized by a magnet for supporting the mobile data carrier. The user can attach his or her mobile data carrier to this magnet so that subsequently he or she may use the machine tool in accordance with his or her authorizations. In addition or as an alternative to the support by magnetic force, the support may be achieved by the shape of the control desk. For example, a retainer may be provided at the side of the control desk, into which the mobile data carrier can be inserted in order to be supported there mechanically and/or magnetically.

A particularly advantageous embodiment of the machine tool comprises a display device for displaying at least one element of the group of data, comprising operation functions which may be performed in accordance with the data received, selected operation functions and the present state the machine tool is in. This display device provides the user with an overview of the current room for maneuvers and need to act on the machine tool. In a particularly advantageous embodiment this display device is integrated with a selection device. This may be done e.g. by light emitting diodes arranged in the immediate vicinity to the keys of the selection device.

Preferably, the selection device consists of keys, in which case a respective operation function can preferably be selected with each key. Preferably, when selected by the user, each individual key only reacts if the user has the authorization to perform the operation function selected by the key. Therefore, the keys may also be referred to as authorization keys.

Preferably, the display device of the machine tool displays a warning display if the reception device does not completely receive the data from the mobile data carrier in order to draw the user's attention to the fact that the data of his or her mobile data carrier cannot be received completely. This may optionally be done by displaying a warning text or by displaying symbols.

This has the advantage that the user's attention is drawn to it if the reception of the data from his or her mobile data carrier is not completely possible because the data carrier is e.g. defective or used in the wrong manner, for example if it is not correctly placed against the machine tool. However, it is also still possible that the reception device shows the warning display only after several failed attempts to receive.

Preferably, the display device of the machine tool is furthermore set up to display a changeable display text, and the machine tool comprises a setup device for setting up changeable display texts and allocating changeable display texts to users, the determining device determining on the basis of the data received which changeable display text is to be displayed by the display device.

This has the advantage that for each user individual display texts can be set up. Thus, it is possible e.g. to set up display texts in the user's language if the machine is operated by users speaking different languages. Furthermore, it is possible that the setup device for setting up display texts and allocating display texts to users may only be operated by users of the authorization level of the highest rank.

Furthermore, the invention comprises an authorization data providing device for providing data for the reception on a machine tool according to the invention. Preferably, this authorization data providing device comprises a mobile data carrier set up for interacting with an inventive machine tool. The mobile data carrier comprises storage means for storing data by means of which it can be determined which operation functions may be performed by the user. This authorization data providing device has the advantage that it can provide data by means of which the access control device of the machine tool is able to control access to the machine tool.

Preferably, the mobile data carrier is a transponder. Particular advantages result if this transponder is realized on the basis of RFID technology. However, the mobile data carrier may be a magnetic strip card, a chip card, a bar code, a USB memory stick or the like.

Preferably, the authorization data providing device comprises means for obtaining authorization data on the basis of a user identification and of data depending on the fact which machine tool trainings the user identified by the user identification has attended.

On the one hand, this means makes it possible that an administrator may enter a user identification and thus obtains the user's authorization data. On the other hand, by using this means a machine tool the reception device of which has merely received a user identification is able to find out, for example via a local data network, which operation functions the user may perform on the machine tool.

Preferably, the authorization data providing device comprises means for storing the authorization data in the storage means of the mobile data carrier. In this manner the mobile data carrier can transmit the authorization data directly to the reception device so that an additional inquiry may be omitted.

Preferably, the authorization data indicate for more than one machine tool which operation functions the user may perform on the respective machine tool. In this manner the user only needs a respective single mobile data carrier, by means of which he or she may obtain access to all machine tool functions he or she is authorized to perform, e.g. due to completed machine tool trainings, even if he or she uses many different machine tools in a factory building.

As already explained above, the operation functions the user is allowed to perform may correspond to one or more operation modes in the sense of the European guidelines and standards.

Preferably, the mobile data carrier comprises display means for displaying which authorization data correspond to the data stored on the mobile data carrier. This may e.g. be done by an imprint or by a light emitting diode display. Particularly, if the storage means for storing data contains unchangeable data the idea that the mobile data carrier comprises an imprint providing information on the unchangeable data to the user presents itself.

Preferably, it is possible to clearly identify the user by means of the unchangeable data stored in the storage means of the mobile data carrier. Thus, the unchangeable data can be clearly allocated to a user and the user performing operation functions of the machine tool is clearly identified after the reception device of the machine tool has received the unchangeable data.

Preferably, the unchangeable data contain a piece of information as to which authorization level the user has. Thus, the determining device can determine only on the basis of the unchangeable data received in the reception device which operation functions the user may perform or may not perform. Then, a further comparison with further user-specific or generally stored authorization data will not be necessary.

If the storage means for storing data contains changeable data, the mobile data carrier preferably comprises a data display providing information on the data currently stored in the storage means to the user. This data display may e.g. be realized by a plurality of light emitting diodes. In this manner the user can easily obtain information on his or her authorizations by examining the mobile data carrier.

In an embodiment of the invention the authorization data providing device comprises means for storing a user identification in the storage means.

Preferably, the mobile data carrier comprises a magnet for attaching the mobile data carrier to a machine tool according to the invention. In this manner the mobile data carrier is easy to keep in the vicinity of the reception device of the machine tool.

In a preferred embodiment the authorization data providing device additionally comprises a device for attaching the mobile data carrier to a key ring. In this manner the user can carry along the mobile data carrier on his or her bunch of keys in a simple and safe manner.

The above-mentioned embodiments may be combined in any way by a person skilled in the art to put the present invention into practice. Advantageous layouts and further details of the present invention will be described below using various embodiments with reference to the drawings.

Figure 1:
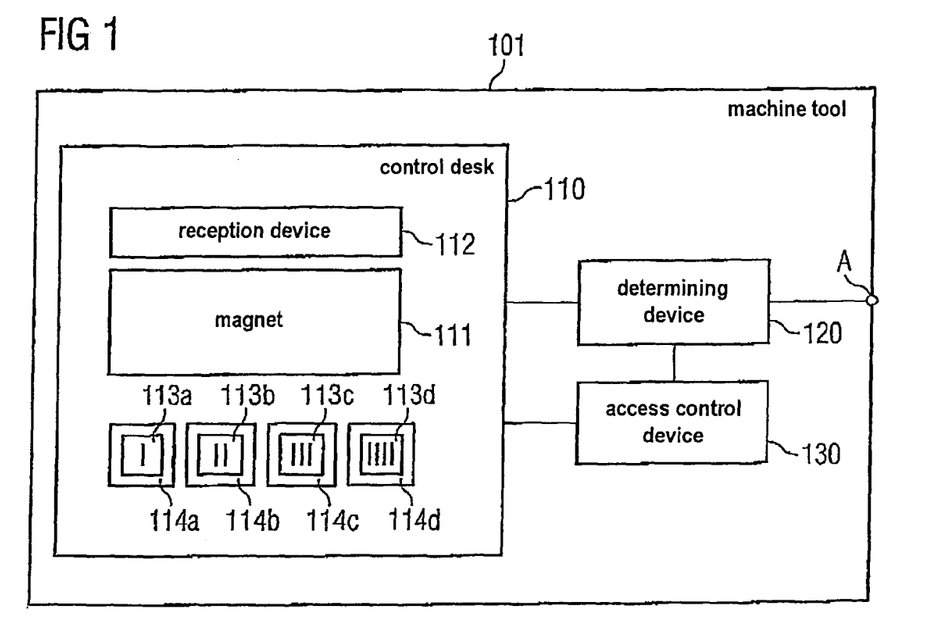
FIG. 1 schematically shows an embodiment of a machine tool according to the invention.

FIG. 1 shows an embodiment of a machine tool 101 according to the invention as a simplified scheme. The machine tool 101 comprises a control desk 110. The control desk 110 comprises a magnet 111, a reception device 112, a selection device 113a-113d and a display device 114a-114d. The magnet 111 can be used to attach a mobile data carrier thereto. The mobile data carrier sends data to the reception device 112. The user can select one or more operation functions by means of the keys 113a-113d forming part of a selection device. Preferably, each single key 113a-113d, by means of which a respective operation function can preferably be selected, only reacts if the user has the authorization according to the data received by the reception device 112 to perform the operation function selected by the key. Insofar, this key may also be referred to as an authorization key. In the embodiment as shown, the keys are respectively bordered by a light emitting diode 114a-114d. These light emitting diodes can be used to indicate to the user which operation functions may be performed by the user (for example by the color green), which operations functions have been selected (for example by flashing) and in which state the machine tool currently is (for example, by an illuminated dot of a different color circulating the corresponding key).

Furthermore, the machine tool 101 comprises a determining device 120 and an access control device 130. On the basis of the data which the reception device 112 has received, the determining device 120 determines which operation functions may be performed by the user. Based on this determination the access control device 130 control access to the machine tool by granting the user access to only those selected operation functions the user is authorized to perform. In order to determine the authorizations, the determining device 120 can access a server via an interface A, for example via a local data network, where the authorizations of the identified user can be queried by means of the user identification.

Figure 2:
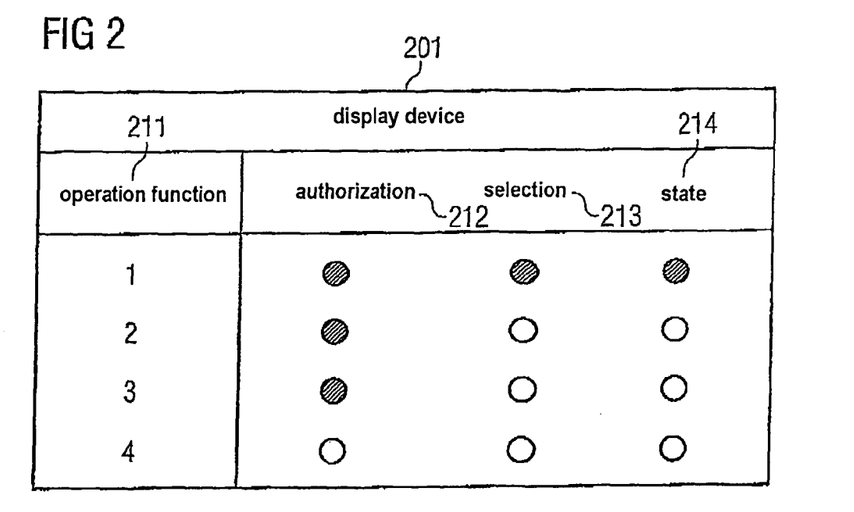
FIG. 2 shows an embodiment of a display device according to the invention.

FIG. 2 shows a further embodiment of an inventive display device, as it might be displayed as a window e.g. on the screen of a machine tool. The display device 201 comprises four columns, a column 211 for displaying the operation functions, a column 212 for displaying which operation functions may be performed by the user, a column 213 for displaying which operation function has just been selected by the user, and a column 214 displaying the state the machine tool is currently in. As shown in FIG. 2, in the example as illustrated the user is authorized to perform operation functions 1, 2 and 3. Operation function 1 has just been selected and currently the machine tool is in this state.

Figure 3:
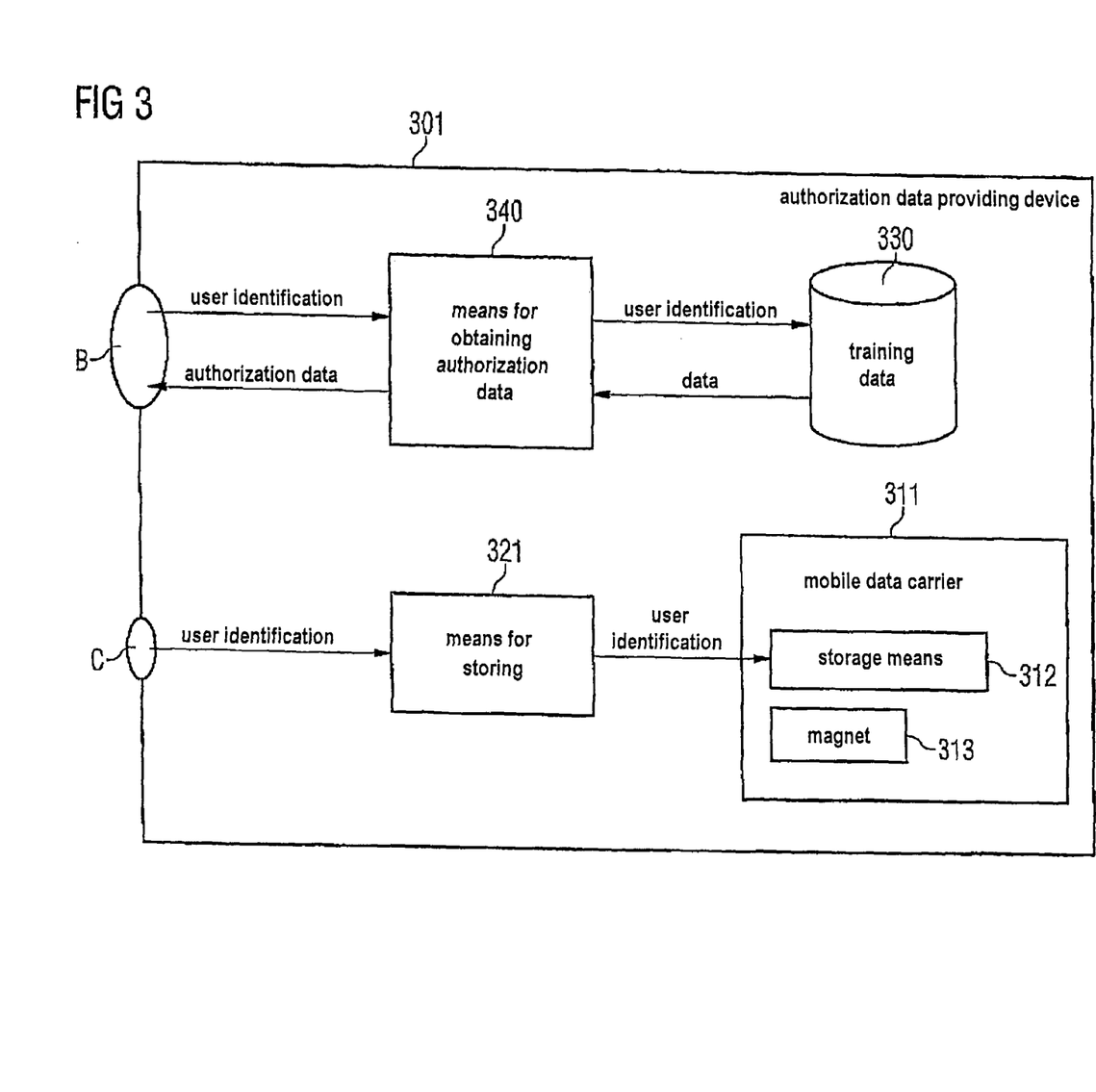
FIG. 3 shows an embodiment of an authorization data providing device.

FIG. 3 shows an embodiment of an authorization data providing device according to the invention. The authorization data providing device 301 comprises means for storing 321 and a mobile data carrier 311, which in turn comprises storage means 312 and a magnet 313. It is possible to communicate to the means for storing 321 a user identification via interface C, which this means will then store into the storage means 312 of the mobile data carrier 311. In this manner the mobile data carrier is configured to send out the user identity of the user. It is possible to attach the mobile data carrier 311 to a machine tool by means of the magnet 313 such that the mobile data carrier can send the user identification stored to the reception device of the machine tool.

Furthermore, the illustrated embodiment of an authorization data providing device 301 comprises a data base 330 containing training data and means for obtaining authorization data 340. A machine tool receiving a user identification from the mobile data carrier can send an inquiry to the means for obtaining authorization 340 via interface B. This inquiry will be sent to the authorization data providing device 301, e.g. via a local data network, and comprises the user identification. The means for obtaining authorization data 340 inquires corresponding data at the data base 330 using the user identification, obtains the corresponding authorization data from the data of the training data base 330, and returns the same to the machine tool via interface B. In this manner, the machine tool can inquire the corresponding authorization data based only on a user identification. As an alternative, it is of course possible to store the authorization data directly into the mobile data carrier 311 so that the machine tool directly receives the authorization data, and the above-described inquiry may be omitted.

Figure 4:
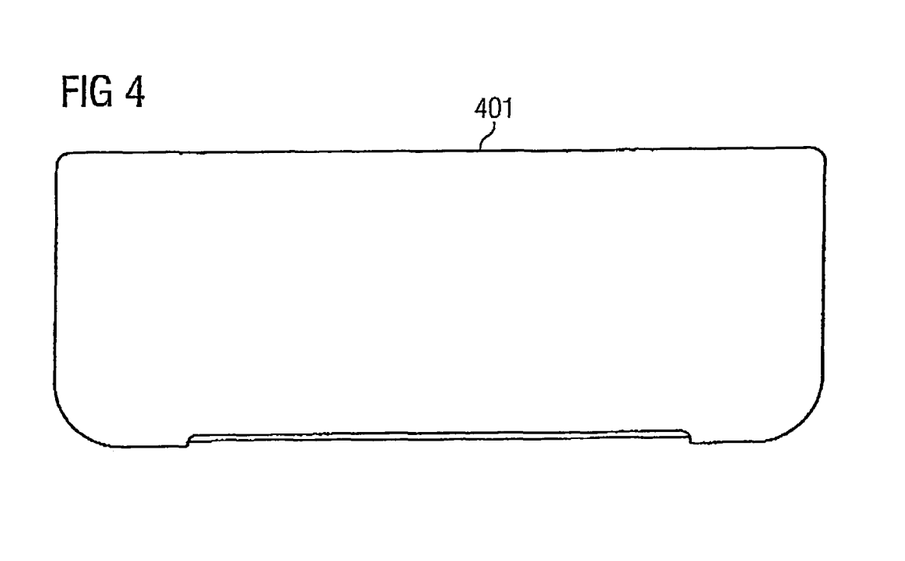
FIG. 4 shows a plan view of an embodiment of a mobile data carrier.

FIG. 4 shows a plan view of an embodiment of a mobile data carrier according to the invention. The mobile data carrier 401 contains a transponder communicating wirelessly with a reception device 112. Due the wireless communication it is possible to keep the outer geometry simple.

Figure 5:
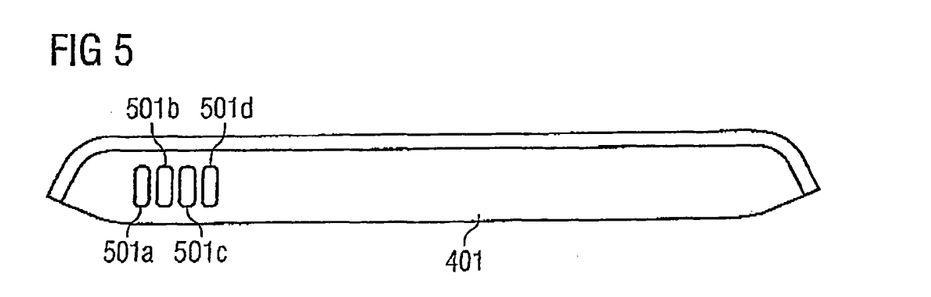
FIG. 5 shows a side view of an embodiment of a mobile data carrier.

FIG. 5 shows a side view of the mobile data carrier 401. In the embodiment as shown, four light emitting diodes 501a-501d indicating to the user which authorizations he or she has are located laterally on the mobile data carrier 401.

Figure 6:
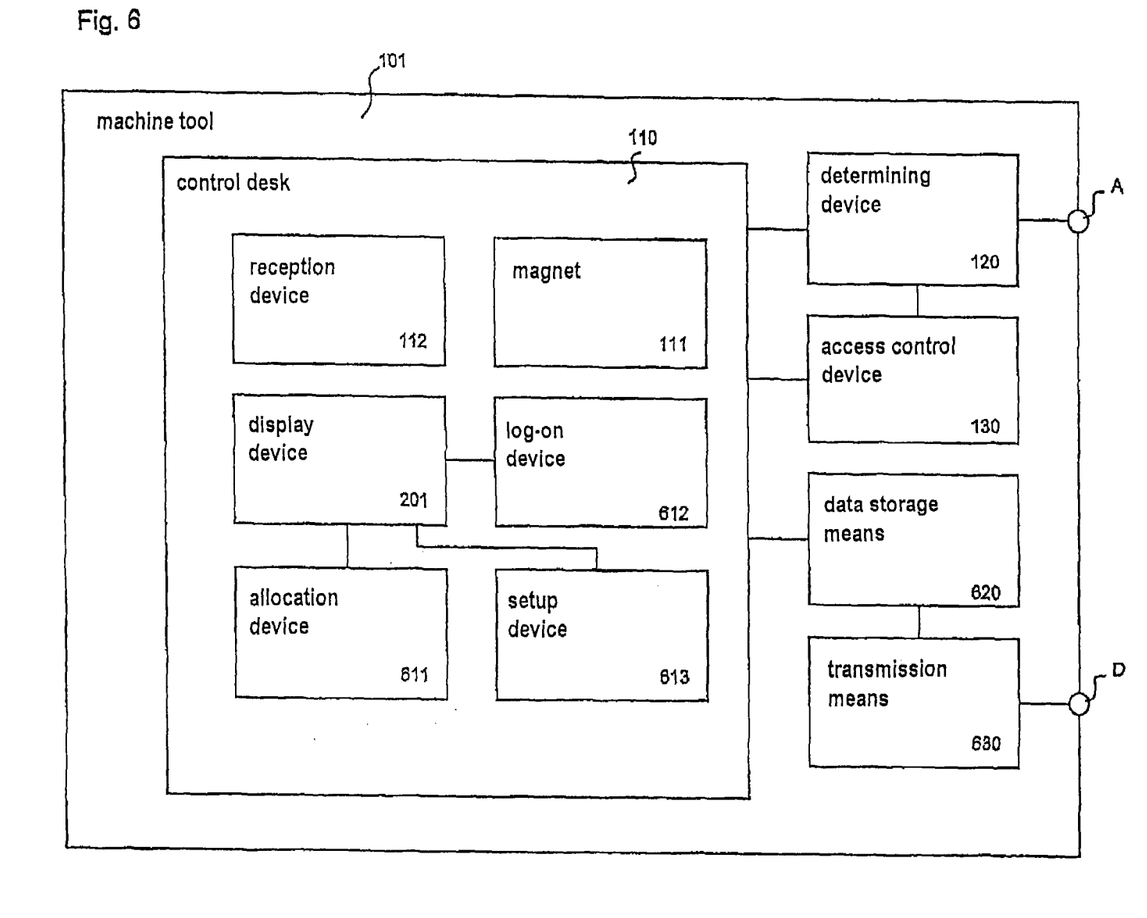
FIG. 6 schematically shows a further embodiment of an inventive machine tool.

FIG. 6 shows a further embodiment of a machine tool 101 according to the invention as a simplified scheme. The machine tool 101 comprises a control desk 110, a determining device 120 connected to an interface A, an access control device 130, data storage means 620 and transmission means 630 for transmitting data stored in the data storage means to external storage means. To this end, an interface D is provided in the machine tool.

The control desk 110 comprises a magnet 11, a reception device 112 and a display device 201. Furthermore, the control desk 110 comprises an allocation device 611 which, when operated, enables a user to allocate operation functions to authorization levels if this user has an authorization level authorizing him or her to perform the operation function of allocating operation functions to authorization levels. Additionally, the control desk 110 comprises a log-on device 612 which, when operated, enables a user to log on other users to the machine tool 101. The operation of the log-on device 612 requires the user to be authorized to perform the operation function of logging on other users to the machine tool. The determining device 120 of the machine tool is set up to determine whether the user is logged on to the machine tool if data from the mobile data carrier 311 of this user are received by the reception device 112. If a user is not logged on to the machine tool, it is determined that he or she is not authorized to perform operation functions of the machine tool. Furthermore, the control desk 110 comprises a setup device 630 enabling a user to set up changeable display texts and allocate the display texts to users logged on to the machine tool by operating the setup device 613. The setup display texts can be automatically displayed by the display device 201 if a user logged on to the machine tool attaches his or her mobile data carrier 311 to the magnet 111 and the data from the mobile data carrier 311 are received by the reception device 112.

According to a further embodiment of the present invention unchangeable data are stored in binary form in the storage means 312 of a mobile data carrier 311. Here, the first four bits of the unchangeable data refer to the information on the authorization level of the user of the mobile data carrier 311. The options for the authorization levels comprise a master authorization level, a service authorization level and a plurality of further authorization levels. The master authorization level represents the highest ranking authorization level, that is, the authorization level of the highest rank in the hierarchic order of authorization levels. A user having a specific authorization level for performing various operation functions of the machine tool 101 has a mobile data carrier 311 with unchangeable data including the information on the user's authorization level in the first four bits. With a mobile data carrier 311 of a specific authorization level the user is authorized to perform operation functions of his or her authorization level and the authorization levels having a lower rank. Thus, the user of the master authorization level is authorized to perform all operation functions of the machine tool 101. This user will continue to be referred to as master. For example, the master may also perform the operation functions of logging on users and allocating operation functions to authorization levels at the log-on device 612 for logging on users to the machine tool 101. A user of the service authorization level is authorized to log on other users and perform a service operation of the machine tool. This service operation of the machine tool 101 includes, for example, a control of a work function of the machine tool 101 at reduced speed and with opened safety devices of the machine 101.

The other bits of the unchangeable data stored in binary form in the mobile data carrier 311 represent unambiguous unique unchangeable data and in the following will be referred to as a unique number. As this portion of the unchangeable data is unambiguous and unique, according to this embodiment of the invention each individual mobile data carrier 311 can be clearly identified by the unique number stored in the mobile data carrier. Thus, each unique number is clearly allocated to a specific mobile data carrier 311 and vice versa.

Alternatively, according to a further embodiment of the present invention, all bits of the unchangeable data including the first four authorization level bits also represent the unique number. Thus, according to this embodiment, the unique number comprises a piece of information on the user's authorization level.

In an embodiment of the mobile data carrier 311 the unique number is visibly printed on the outside of the mobile data carrier 311 in decimal notation.

In a further embodiment of the mobile data carrier 311, the mobile data carrier 311 comprises a transponder. As soon as the mobile data carrier 311 is placed against the machine tool 101, all bits of the unchangeable data stored on the mobile data carrier 311 are transmitted from the transponder to the reception device 112 of the machine tool 101. During this process, all bits of the unchangeable data are always transmitted completely. Should the complete transmission of the bits fail, the transmission of all bits, that is, the complete unchangeable data, is repeated until all bits have been transmitted once entirely and completely. Only if all bits have been transmitted completely, the determining device 120 can determine which operation functions may be performed by the user.

According to a further embodiment of the machine tool 101 the number of repetitions of the transmission attempts is limited. If a complete transmission of all bits of the unchangeable data of the mobile data carrier 311 has not worked after a specific number of repeated transmission attempts, the user is informed via the display device 201 that the transmission of the data does not work. For this purpose, a warning notice is displayed in the display device 201 informing the user that the unchangeable data cannot be received from his or her mobile data carrier 311. Then, the user can determine whether his or her mobile data carrier 311 is defective or whether he or she did not place the mobile data carrier 311 correctly.

In a further embodiment of the machine tool 101 the authorization level of the user of the mobile data carrier is displayed in the display device 201 after the mobile data carrier has been placed and the unchangeable data have been completely received by the reception device 112.

In an alternative embodiment of the machine tool 101 the display device 201 displays an access level of the user to operation functions of the machine tool 101, one or more of the operation functions of the machine tool 101 being allocated to an access level as in the case of an authorization level. In this case, the user may perform operation functions allocated to his or her access level or to an access level of a lower rank than his or her access level. Here, the allocation of operation functions to authorization levels and access levels is not identical. By introducing a second option of allocating operation functions, it is possible to introduce allocations according to different aspects. For example, the allocation to authorization levels according to aspects of danger upon performing the operation functions and the allocation to access levels according to the user's qualification can be allocated or vice versa.

In an embodiment of the machine tool 101 the machine tool 101 comprises a log-on device 612 for logging on users. The operation of the log-on device 612 is permitted only for a user of the master authorization level or the service authorization level. Users with authorization levels of a lower rank only have an authorization for performing operation functions of the machine tool 101 if they have been logged on to the machine tool beforehand. In order to log on a user to the machine tool, the master operates the log-on device 612 for logging on users. To this end, he or she must first place his or her mobile data carrier 311 to the machine tool 101 so that the determining device 120 can determine that he or she is authorized to operate the log-on device 612 for logging on users. When the log-on device 612 for logging on users is operated, a table is displayed in the display device 201. This table contains information as to which users have already been logged on to the machine tool 101 by entering the unique numbers of the logged-on users into the table. If now the mobile data carrier 311 of a user not yet logged on is placed on the machine tool 101 after the mobile data carrier 311 of the master has been removed, the display device 201 is set up to automatically display the unique number of the mobile data carrier 311 of the not yet logged-on user in the table in the display device 201 after the reception device 112 has received the unique number from the mobile data carrier 311.

In a further embodiment of the machine tool 101, beside the above-described operation steps, the log-on device 612 for logging on users is set up to enable the input of changeable data into the display of the table next to the display of the unique number. These changeable data contain training data and will be referred to as a clearing code in the following. The clearing code contains encrypted data on which trainings the user has attended. This clearing code allows the clearing of operation functions in dependence on the user's qualification. The clearing code is encrypted by a predetermined encryption algorithm, and by back-calculating the encryption algorithm the determining device 120 can determine which operation functions are to be cleared for the user on the basis of the tool trainings attended. Furthermore, the log-on device 612 for logging on users makes it possible to input a new clearing code by operating the log-on device 612 for logging on users for whom an old clearing code is already displayed in the table. Thus, after back-calculating the encryption algorithm anew, further operation functions are cleared. The unique number is added to the encryption algorithm and can be clearly decoded from the clearing code. As the unique number can additionally be input into the clearing code by operating the log-on device 612 in the table in the display device 201, it is thus possible to prevent errors from occurring during input, and it can be determined whether the unique number and the clearing code match. As the user's authorization level is determined by the first four bits of the unchangeable data of his or her mobile data carrier 311, only further operation functions of this authorization level or of authorization levels of a lower rank can be cleared.

In a further embodiment of the present invention the machine tool 101 comprises an allocation device 611 for allocating one or more operation functions to a plurality of authorization levels. The master is authorized to operate this allocation device 611. In this process, he or she may change the allocation of operation functions to authorization levels.

In a further embodiment of the present invention the machine tool 101 comprises a data storage means 620 for storing log-on data indicating which users have been logged on by the master. If the master inputs the clearing code when logging on the user, the clearing code will also be stored in the data storage means 620. The data stored in the data storage means 620 may be displayed in a table in the display device 201. Furthermore, the machine tool comprises transmission means 630 for transmitting the log-on data stored in the data storage means 620 to an external USB memory stick and for transmitting the log-on data stored in the USB memory stick to the data storage means 620 of the machine tool. Thus, the master can transmit all log-on data stored in the data storage means 620 of the machine tool to another machine tool by means of a USB memory stick. Thus, the master does not have to individually log on all users logged on to the machine tool again to the other machine tool, but he or she can log on the users by transmitting the log-on data from the USB memory stick to the data storage means 620 of the machine tool. In the present embodiment the interface D of FIG. 6 is a USB port.

Moreover, in a further embodiment of the machine tool of the present invention, the data storage means 620 can store operation data indicating which operation functions the machine tool has performed, which user has performed these operation functions of the machine tool and when the user has performed these operation functions. Thus, it is possible to record who performed which operation functions on the machine tool at what time, like in a control log.

In a further embodiment of the machine tool of the present invention the machine tool comprises a setup device 613 for setting up changeable display texts and for allocating display texts to users. This setup device 613 may only be operated by the master. By operating the allocation device 613 the master can set up individual changeable display texts for each user logged on the machine tool. Then, if a user places his or her mobile data carrier 311 against the machine tool 101, the determining device 120 is able to determine on the basis of the data received which display text is allocated to the user, and this display text will then be displayed in the display device 201. This makes individual display texts for each user possible, such as greeting phrases, operation instructions or hints in the user's language.

The embodiments as shown are to be construed as merely illustrative and not limiting. Numerous modifications can be made to them without departing from the scope of the claims. For example, it is possible, of course, to store the authorization data directly into the mobile data carrier. These and other modifications are obvious to the person skilled in the art and are disclosed to the skilled person by the above embodiments in combination with the patent specification and the claims.

The invention claimed is:

1. A system for controlling user access to a machine tool comprising:
   a machine tool, the machine tool having:
      one or more operation functions, the one or more operation functions being accessible by a user only after authorization of the user specifically for one or more selected operation functions of the one or more operation functions by receipt of predetermined authorization data from a wireless mobile data carrier;
      a selection device for selecting one or more of the operation functions by the user;
      a reception device for receiving data from the wireless mobile data carrier, the reception device comprising a reading device configured to read authorization data and identification data received from wireless mobile data carrier;
      an allocation device for allocating the one or more operation functions to authorization levels, the allocation device only being operable by the user if the user has a predetermined master authorization level in a hierarchic order of the authorization levels, the hierarchic order codified by the authorization data;
      a determining device for determining, on the basis of the authorization data received from the wireless mobile data carrier, one or more authorized operation functions the user is authorized to perform of the one or more operation functions; and
      an access control device set up to control the access to the machine tool with respect to the one or more selected operation functions and grant the user access to only those of the one or more selected operation functions that the user is authorized to perform according to an authorization level codified by the authorization data received from the wireless mobile data carrier; and
   a plurality of wireless mobile data carriers each having a read-only storage device in which authorization data and identification data for identifying a single wireless mobile data carrier of said plurality of wireless mobile data carriers are stored and a radio frequency transponder configured to transmit the authorization data and the identification data to the reception device of the machine tool,
   said plurality of wireless mobile data carriers including a first set of at least one or more wireless mobile data carriers configured to transmit authorization data codifying a first authorization level and a second set of at least one wireless mobile data carrier configured to transmit authorization data codifying a second authorization level, wherein the first authorization level includes the predetermined master level for allocating operation functions to authorization levels, whereas the second authorization level does not include the predetermined master authorization level.

2. The system for controlling user access to a machine tool according to claim 1,
   wherein the reception device comprises a reading device set up to interact with a transponder as a mobile data carrier.

3. The system for controlling user access to a machine tool according to claim 1,
wherein data identifying the user is used by the determining device for inquiring authorization data of the user.

4. The system for controlling user access to a machine tool according to claim 1,
wherein the machine tool further comprises a log-on device for logging on the user, the user being authorized to perform the one or more operation functions if the user has been logged on.

5. The system for controlling user access to a machine tool according to claim 4,
wherein the log-on device enables the input of changeable training data, the changeable training data indicating machine tool trainings the user has attended, and the user being authorized to perform the one or more operation functions on the basis of the changeable training data.

6. The system for controlling user access to a machine tool according to claim 4,
wherein the machine tool further comprises data storage means for storing log-on data indicating which of one or more users are logged on.

7. The system for controlling user access to a machine tool according to claim 6,
wherein the machine tool further comprises external storage means for storing the log-on data, transmission means for transmitting the log-on data stored in the data storage means to the external storage means and for transmitting the log-on data stored on the external storage means to the data storage means.

8. The system for controlling user access to a machine tool according to claim 6,
wherein the data storage means furthermore stores operation data indicating which of the one or more operation functions the machine tool has performed, by which of the one or more users the indicated operation functions were performed, and when the one or more users performed the indicated operation functions.

9. The system for controlling user access to a machine tool according to claim 1,
wherein a display device displays data from the group consisting of which of the one or more operation functions the user is authorized to perform according to the authorization data received, selected operation functions, and a current state the machine tool is in.

\* \* \* \* \*